Sept. 5, 1939.                    G. L. BAKER                    2,171,823
                              APPARATUS TO TEST JUICES
                                 Filed Aug. 6, 1937
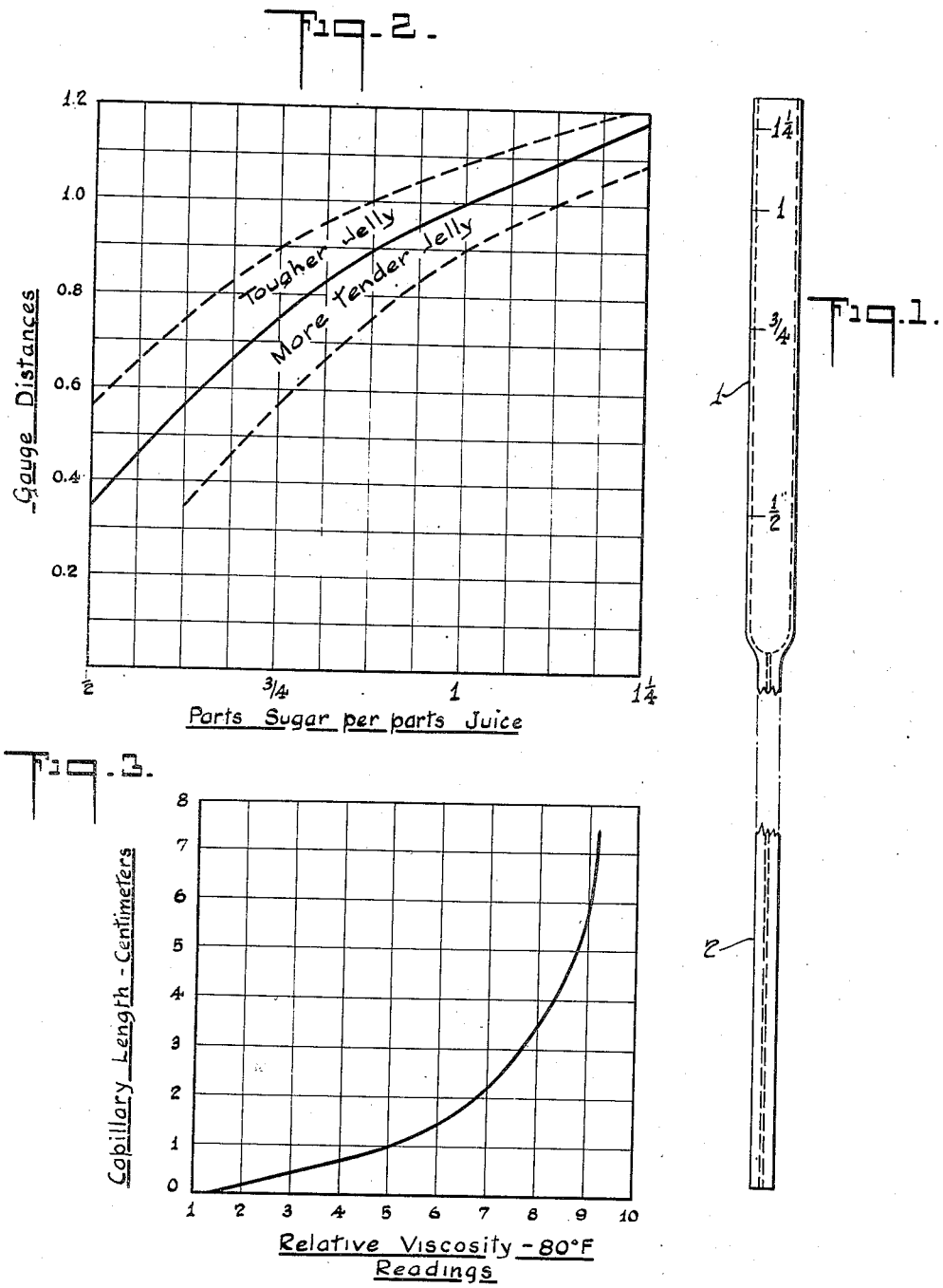

Patented Sept. 5, 1939

2,171,823

UNITED STATES PATENT OFFICE 2,171,823

APPARATUS TO TEST JUICES

George L. Baker, Newark, Del.

Application August 6, 1937, Serial No. 157,669

2 Claims. (Cl. 73—51)

This invention relates to jelly manufacture, and particularly to apparatus for determining directly the sugar requirements of given pectous juices to be jellied.

It has been found that juices vary in their ability to set or jell when sugar or similar dehydrating agents are added. This characteristic is expressed as the sugar-supporting capacity of the juice. If too little sugar is used in proportion to the sugar-supporting capacity of a juice, the resulting jelly is tough, and if too much sugar is used the jelly is too tender or else the juice does not jell at all. The jellying powers, or sugar-supporting capacity, of fruit juices vary with many factors, such as the kind of fruit, ripeness of the fruit, conditions of extraction of the juice, deterioration of pectous jellifying substances contained in the juice, acidity, presence of salts, and other factors; for jelly is a complex physical-chemical system.

It has been difficult to evaluate the sugar-supporting capacity or jellying quality of given juices, and particularly to ascertain in simple manner the amount of sugar to add to a given batch of juice. Ready tests of a sort have been proposed for evaluating fruit juice, but such tests have been too cumbersome to overcome the inertia and inexperience of users, such as housewives. Many tests are inaccurate because of the small amounts of pectous bodies encountered, as from about 0.2 of one percent to three percent, or else ignore differences in quality or degree of degradation of the pectous jellifying bodies.

It is desirable to provide apparatus for evaluating the jellying properties of fruit juices, which will be both accurate and simple, for use by housewives or manufacturers.

An object, therefore, of this invention is to provide evaluating apparatus to test the sugar requirement, or potential jellying power, of fruit juices or other pectous juices; and particularly so to test small quantities of juice. An important object is to provide such apparatus in sufficiently simple and convenient form as to induce its use by housewives, but also sufficiently accurate for manufacturers. An object is to embody means in such an instrument to indicate sugar requirements directly for different juices, and to embody such means in an instrument that permits tests to be completed in a relatively short time. A further object is to provide such apparatus suitable for juices of considerable range of jellying power, and also of a form that admits of rapid and low-cost manufacture. These and other objects will appear from the following illustrative description of the principles of this invention, taken with the accompanying drawing of preferred embodiments thereof, and the breadth of this invention will be more particularly pointed out in the annexed claims.

In the drawing:

Fig. 1 shows in side elevation a preferred embodiment of this invention, while

Fig. 2 is an illustrative chart or graph of the mathematical basis of arranging indicia of the apparatus according to this invention, and Fig. 3 is a chart illustrating the selection of suitable length of capillary outlet tube for apparatus of this invention.

According to the principles of this invention, the objects stated and others are accomplished by apparatus comprising a cylindrical reservoir having a straight capillary outlet of specified length, more fully described hereinafter, with the reservoir exhibiting indicia according to a certain logarithmic arrangement. Preferably such indicia specify proportions of sugar to be added, from about one-half to about one and a quarter units per unit of juice under test.

Referring more particularly to the drawing for illustration of this invention, a cylindrical reservoir 1 is shown in Fig. 1, with a straight capillary outlet 2 open at the bottom. The reservoir preferably is transparent where simple visual observation of various liquid levels is desired. Reservoir 1 may be conveniently of glass tubing about 100 millimeters in length and about 8 millimeters internal diameter, though these dimensions may vary for convenience. Such a tubular reservoir may be about two to five cubic centimeters capacity.

The capillary outlet tube 2 may be about 0.5 to 0.75 millimeters diameter of bore, or preferably about 0.65 to 0.75 millimeter. Capillary bore less than about 0.5 millimeter unduly limits flow of liquid and decreases the range of juices that may be tested; while diameters greater than about 0.75 millimeter permit too rapid flow. Within the limits stated, however, various irregularities of apparatus or of test liquid are rendered insignificant.

However, as indicated in Fig. 3, the length of capillary outlet is important. This length of outlet preferably is substantially 75 millimeters. The length, in general, is such that limited deviations therefrom scarcely affect readings of the relative viscosity of test liquid flowing through the apparatus. For example, Fig. 3 shows that with but minor error the capillary tube may be as short as about 60 millimeters, and may be of convenient length greater than 75 millimeters, but lies within the "flat" portion of the curve of Fig. 3. This curve, of relationship between length of the capillary outlet tube and observed or apparent viscosity readings of test liquid, illustrates the considerable error and variation of observed viscosity when the capillary outlet is too short. For convenient comparison, Fig. 3 is placed adjacent to the capillary outlet tube 2 shown in Fig. 1, with length of capillary shown vertically.

An important feature of this invention resides in the logarithmic arrangement of indicia on the reservoir 1, such as the gauge marks shown in Fig. 1, in terms of sugar requirements of juices under test. Nearest the top of the cylinder 1 is the mark 1¼; at the level below is gauge mark 1; at a greater distance below 1 for a similar decrement of sugar supporting capacity of juice is the mark ¾; while considerably below is the mark ½. A relatively weak fruit juice falling from a reference level such as the top of the gauge to the ¾ mark in a given interval of time would require, for example, ½ cup of sugar per cup of juice less than a higher quality juice which in the same time would flow only to the 1¼ gauge line.

For further understanding of the broader aspects and degree of variation of this invention with respect to arrangement of these gauge marks, the chart of Fig. 2 is placed in juxtaposition to Fig. 1. In this chart, sugar-supporting values of juices are shown as abscissae or $x$-values, while corresponding distances of flow of liquid in this apparatus are shown as ordinates, or $y$-values. In other words, test juices at about 80° F. flow in the cylindrical reservoir 1 during a given time, distances corresponding to their sugar-supporting power. That is, these gauge distances show the amount of sugar to be added to form jelly with a given fruit juice.

As illustrated in Fig. 2, the relationship of distances between the various gauge marks for various amounts of sugar required per part of juice under test may be expressed mathematically according to the formula:

$$k - \frac{1}{\log y} = k - \frac{1}{ax+b}$$

where $k$, $a$ and $b$ are constants and $y$ is the relative viscosity of a given juice, and $x$ is the sugar-supporting value thereof.

In the particular curve shown, for jelly strength 40 (units representing centimeters water pressure as measured by the well-known Tarr-Baker jelly strength tester) for jelly of 65% soluble solids, this expression becomes:

$$k - \frac{1}{\log y} = k - \frac{1}{0.8x+0.2}$$

The constant $k$ may be varied according to the length, base point, or other characteristics of the apparatus, but for the tube shown in Fig. 1, and the chart of Fig. 2, $k$ may be taken as 2. Then test liquids of differing sugar-supporting values will drop during one minute of flow from the starting line or open top of tube 1 to some respective depth in the tube designated by the gauge lines at different levels. As shown, the tube 1 of Fig. 1 is so placed with respect to the curve of Fig. 2 that values of ordinates, or gauge lines, fall at similar heights on tube 1. Thus ½ is at a height of 0.34 unit of length on the chart scale; ¾ gauge line at height 0.75; gauge line 1 at height 1; and gauge line 1¼ at height 1.17 on the particular curve and tube shown. Thus the distance between the ½ mark and the ¾ mark would bear a relation of 41 vertical units on the chart; while that between the ¾ and the 1 marks would be 25; and that between the 1¼ and the 1 marks would be 17. Thus in this example the middle and the bottom spaces between gauge marks are in ratios of about 1.5 and about 2.4 times greater than the top space shown.

Thus sugar additions per unit of juice may be indicated by direct readings of the level of test juice after one minute flow from a full tube or other reference line. Thus, for example, the level at ½ after one minute flow indicates ½ cup sugar per cup of juice; similarly 1 indicates 1 cup sugar per cup juice, etc.; or ½ pound sugar per pound of juice; 1 pound sugar per pound of juice, etc.

While apparatus may be marked directly from a curve in the manner shown in the juxtaposition of Figs. 1 and 2, it is feasible in commercial practice to place the gauge marks by observing the position of test liquids of known sugar-supporting values. Thus to produce jelly of strength 40, the ½ mark is placed at the level shown by a test juice of relative viscosity of 4 (which corresponds to the vertical value 0.34 shown in Fig. 2), when the juice has flowed one minute from the top of tube 1. Water may be used similarly for marking the ½ mark, but with time of flow 15 seconds. Similarly the ¾ mark is placed at the level of liquid of viscosity 6.3 (which corresponds to height 0.75 of Fig. 2), after flow of one minute from the top of the tube, or of water flowing 60/6.3 seconds. The 1 mark may be placed at the position indicated similarly by liquid of viscosity 10 (which corresponds to height 1.0 of Fig. 2), or by water flowing 6 seconds. The 1¼ mark may be placed at the position indicated similarly by the level of liquid of viscosity 15.9 (which corresponds to height 1.17 of Fig. 2), or by water flowing 60/15.9 seconds. Similarly other $x$ or sugar values may be interpolated as gauge marks. Thus irregularities in the tubular structure become immaterial, when the gauge marks are established as those levels to which reference liquids flow in an allotted time, as one minute.

Fig. 2 shows by dotted lines areas of tougher jelly that correspond to addition of less sugar than the amount required for a given juice, and areas of more tender jelly corresponding to more sugar than required. The particular values shown correspond to the variation in jelly strength where given juices fall half way between the marks shown on tube 1, since the maximum variation in ordinary use probably results from inaccurate readings at such halfway points. Or, the curve in Fig. 2 affords basis for intentional interpolation of intermediate sugar values where the liquid level of test juice after one minute flow from the top of the tube lies between given gauge lines.

Thus a test apparatus is provided of a few cubic centimeters capacity which is sufficiently simple for use even by the average housewife, yet quick and accurate to determine the sugar requirements for juices having a wide range of sugar-supporting values. Or, readings on this apparatus of the sugar supporting capacity of a test juice ascertain also the amount to be added of a pectous mixture of known sugar supporting capacity in order to obtain some standard value, such as may be required by manufacturers in adjusting juices, or in devising quick-boil formulas.

Other similar markings may be arranged on tube 1 for producing jellies of strength other than 40, as for example where tougher jelly is made by commercial manufacturers. In such case, values of a curve as in Fig. 2, or spacing of gauge marks, are obtained after ascertaining from experimental data the values of the constants "a" and "b" in the equation given. Experimental values for jelly strength 60, for example, give a value of $y$ of 5 when $x$ is 0.55; $y$, 8.5 when $x$ is 0.81; $y$, 11 when $x$ is 0.94; and $y$, 13.5 when $x$ is 1.04. Thus for jelly strength 60, "a" in the equation is about 1.0 and "b" about 0.15. For soft jelly of strength 30, "a" is 0.68 and "b" 0.25.

Within the principles herein explained, and within the scope of the appended claims, this invention may be practiced otherwise than as specifically illustrated, as those skilled in this art may now choose.

It may be added that if pectous material is present in a juice in such quantity and of such quality as to impart to the juice sugar-supporting capacity of about 1½ jelly may be made therefrom by the so-called "quick-boil" method. For apparatus such as shown in Fig. 1, a gauge line of 1½ would be at a value of 1.29 on the curve in Fig. 2. "Quick-boil" is feasible where the percentages of juice and of sugar in the described mixture are about 40% juice and 60% sugar.

Gauge lines placed as indicated in Figs. 1 and 2 may be designated to show the amount of pectous material of standardized value to be added to a given juice to prepare the juice for "quick boil." For example, the lower mark shown may be designated as 4 to indicate that 4 tablespoonsful of a given standard pectin solution should be added per cup of the juice; the next higher mark, as 3; etc. It will be understood that to juice so enriched with pectin of known value, 1½ cups of sugar should be added per cup of juice for "quick boil." In brief, this marking may indicate simply and directly the sugar-supporting capacity of a juice in terms of deficiency of a given or standardized pectin from a sugar supporting value of 1½, or other selected base.

I claim:

1. Apparatus to determine the jelling qualities of fruit juices comprising, an open tubular reservoir of about 2 to 5 cubic centimeters capacity having a capillary outlet tube at the bottom of about 60 to 100 millimeters length and about 0.5 to 0.75 millimeter diameter, the reservoir being graduated by indicia at levels according to the logarithmic relationship:

$$k - \frac{1}{\log y} = k - \frac{1}{ax+b}$$

where $k$ is a constant related to base point, and $a$ and $b$ are constants related to strength of jelly to be obtained, $a$ varying from about 0.6 to 1.0, and $b$ varying from about 0.15 to 0.25, $x$ values are sugar-supporting values of test juices equivalent to about 0.5 to about 1.25, and $y$ corresponding to gauge distances ranges from relative values of about 4 to 16.

2. Apparatus as defined in claim 1, in which indicia denoting $y$ values in the stated logarithmic relationship are based on values of $a$ 0.8 and $b$ 0.2.

GEORGE L. BAKER.